US009892025B2

(12) United States Patent
Estevez

(10) Patent No.: US 9,892,025 B2
(45) Date of Patent: Feb. 13, 2018

(54) USING SCRIPT DESCRIPTION TO ENCODE CONDITIONAL STATEMENTS

(71) Applicant: Red Hat, Inc., Raleigh, NC (US)

(72) Inventor: David Caro Estevez, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 57 days.

(21) Appl. No.: 14/625,924

(22) Filed: Feb. 19, 2015

(65) Prior Publication Data
US 2016/0246707 A1 Aug. 25, 2016

(51) Int. Cl.
*G06F 9/44* (2006.01)
*G06F 11/36* (2006.01)
*G06F 9/445* (2018.01)
*G06F 9/455* (2018.01)

(52) U.S. Cl.
CPC ...... *G06F 11/3672* (2013.01); *G06F 9/44526* (2013.01); *G06F 9/45512* (2013.01); *G06F 11/3688* (2013.01)

(58) Field of Classification Search
CPC ............. G06F 11/3684; G06F 11/3672; G06F 17/30306; G06F 8/10; G06F 17/5022; G06F 17/30389; G11B 27/105
See application file for complete search history.

(56) References Cited

U.S. PATENT DOCUMENTS

| 4,617,663 | A * | 10/1986 | Lake | G06F 11/3684 714/32 |
| 8,839,202 | B2 | 9/2014 | Tempel et al. | |
| 2005/0256858 | A1* | 11/2005 | McArdle | G06F 17/30389 |
| 2007/0009228 | A1* | 1/2007 | Matsuno | G11B 27/105 386/287 |
| 2009/0019406 | A1* | 1/2009 | Endoh | G06F 17/5022 716/106 |
| 2009/0210858 | A1* | 8/2009 | Son | G06F 8/10 717/121 |
| 2013/0097586 | A1 | 4/2013 | Chandra et al. | |
| 2013/0338995 | A1 | 12/2013 | Elkins et al. | |
| 2014/0075242 | A1* | 3/2014 | Dolinina | G06F 11/3672 714/27 |
| 2014/0109058 | A1 | 4/2014 | Tempel et al. | |

(Continued)

FOREIGN PATENT DOCUMENTS

WO 2014115189 7/2014

OTHER PUBLICATIONS

Sutton et al.; I.B.M. T.J. Watson Research Center; "Text2Test: Automated Inspection of Natural Language Use Cases"; Oct. 15, 2019; http://domino.watson.ibm.com/library/CyberDig.nsf/papers/8019E0137DAFB34985257665005BFACC/$File/rc24877.pdf; 11 pages.

(Continued)

*Primary Examiner* — Tuan Vu
(74) *Attorney, Agent, or Firm* — Lowenstein Sandler LLP

(57) ABSTRACT

Implementations of using script descriptions to encode conditional statements are disclosed. A method of an implementation of the disclosure includes retrieving a description string associated with an executable script. The method also includes generating, in view of the description string, a conditional statement specifying an action to be performed. The method further includes using the conditional statement to control execution of the executable script.

15 Claims, 4 Drawing Sheets

(56) References Cited

U.S. PATENT DOCUMENTS

2014/0109061 A1 4/2014 Gibbons et al.
2015/0019497 A1* 1/2015 Bostock ............ G06F 17/30306
 707/687

OTHER PUBLICATIONS

Wang et al.; Dept. of Autom. Tsinghua Universtiy, Bejing, China; "An Automatic Generation Method of Executable Test Case Using Model-Driven Architecture", Dec. 9, 2009; http://ieeexplore.ieee.org/xpl/login.jsp?tp=&arnumber=5412403&url=http%3A%2F%2Fieeexplore.ieee.org%2Fxpls%2Fabs_all.jsp%3Farnumber%3D5412403.
Martin Fowler, "Rules Engine"; Jan. 7, 2009; http://martinfowler.com/bliki/RulesEngine.html; 2 pages.

* cited by examiner

| Script 210 | Description 212 | Condition 214 | Action 216 | Conditional Statement 218 |
|---|---|---|---|---|
| Script 1 210a | WAITFOR (myoherjob#123) 212a | (myoherjob#123) 214a | WAITFOR 216a | Will avoid the test from running until the 'myotherjob' has run for the 123$^{rd}$ time 218a |
| | IGNORE(LOG:some error string) 212b | (LOG:some error string) 214b | IGNORE 216b | Will ignore the errors in the run log that match 'some error string' 218b |
| Script 2 210b | WAITFOR(GERRITUS : 12345) 212c | (GERRITUS: 12345) 214c | WAITFOR 216c | Will avoid the test from ignore the errors in the run log that match 'some error string' 218c |
| | FAILIF(LOG:some string) 212d | (LOG:some string) 214d | FAILIF 216d | And this will fail the job if the string is found 218d |
| Script 3 210c | CLOSEONPASS(BZ:1 234) 212e | (BZ:1234) 214e | CLOSEONPASS 216e | This will close the bug number 1234 in bugzilla when the next time it passes the test 218e |

Figure 2

USING SCRIPT DESCRIPTION TO ENCODE CONDITIONAL STATEMENTS

TECHNICAL FIELD

The implementations of the disclosure relate generally to scripts that are executable by computer systems, and more particularly, to using script description in the script to encode conditional statements.

BACKGROUND

Software application is a set of one or more programs designed to carry out operations for a specific application on a computer system. A testing script may be associated with a software application to test certain functional and/or non-functional aspects of the application. The script may comprise a plurality of executable statements.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are for explanation and understanding only.

FIG. 2 is a block diagram illustrating an example of software applications including the descriptions in accordance with some implementations;

DETAILED DESCRIPTION

Implementations of the disclosure provide for using script description to encode conditional statements to be incorporated into the script. The script description is a field in the script that may include information to execute the instruction in the script.

An executable script may comprise a plurality of executable statements. In one example, a test script is employed for testing of the application. In an example testing environment, application may be executed by one or more computer systems (physical or VMs), and one or more testing scripts may be executed by a script execution engine, so that the scripts would be interacting with the application being tested (e.g., transmitting input data to the application and receiving output data from the application, analyzing the output data and analyzing non-functional aspects (e.g., response time, static code analysis, code complexity, performance, memory usage, etc.)

Script may include a description (e.g., a comment or description statement comprising a COMMENT keyword followed by a string of characters) which may be intended for a reference by system administrator. In prior implementations, the string of characters would not, in certain implementations, be interpreted by the script execution engine. That allows a decoupling of the script execution and the script administration, allowing non-interference between what the script does and how it's handled (adding temporary comments to annotate the current, future or past status of the script for example). Other implementations of similar systems are very coupled with the script executing framework, not really decoupling the script implementation from the management and locking the user to a specific script execution framework for consistent script management.

The present disclosure improves the the prior implementations by enhancing the ability of the script execution engine to control the execution of scripts by providing a mechanism of interpreting the descriptions in order to yield conditional statements controlling the execution of the script.

Figure 1:
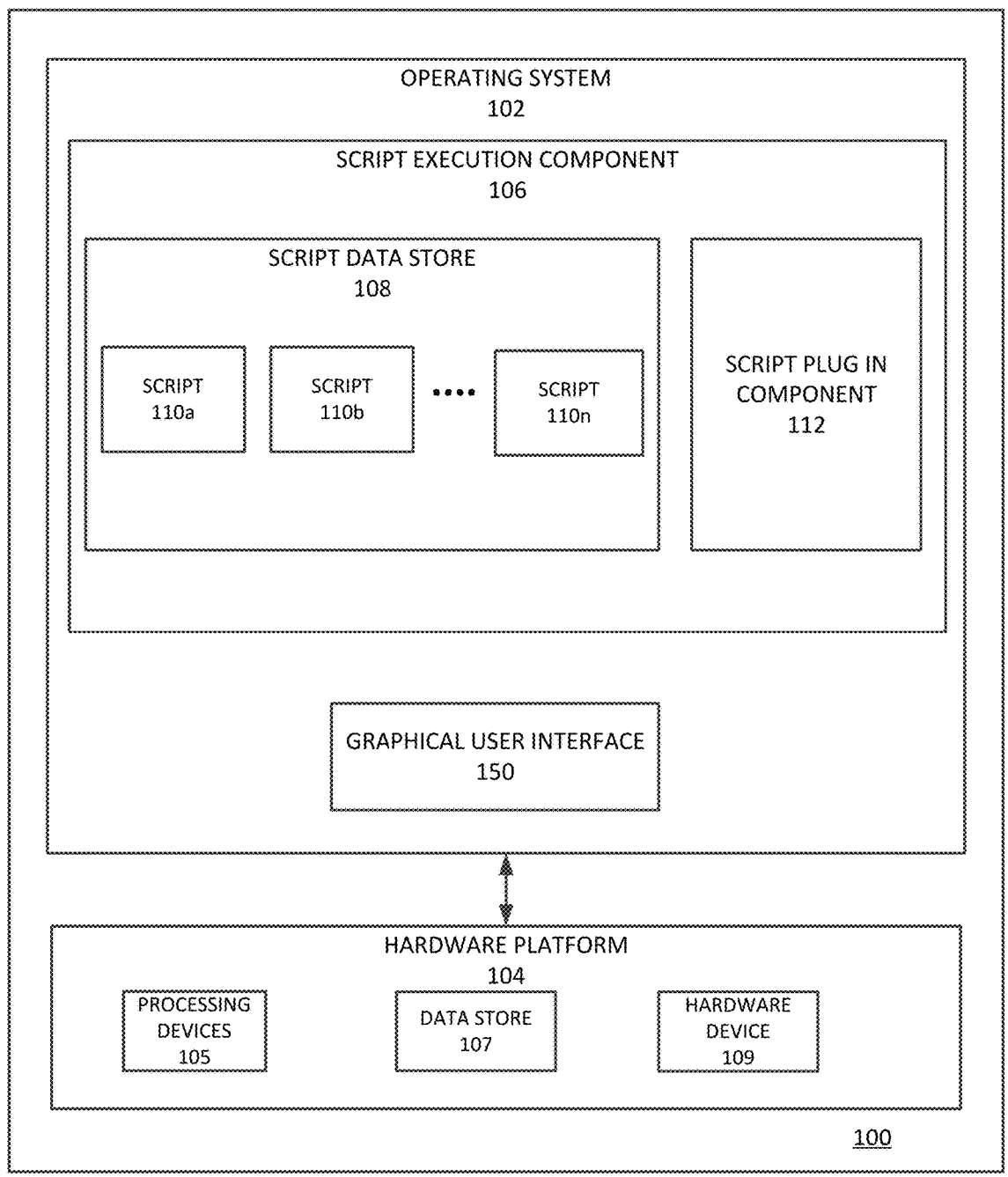
FIG. 1 is a block diagram of a computer system in which the implementations of the disclosure may operate.

FIG. 1 is a block diagram illustrating a computer system 100 in which implementations of the present disclosure may be implemented. In one implementation, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises a hardware platform 104, on top of which runs an operating system (OS) 102. The OS 102 may include Microsoft™, Linux™, Solaris™, Mac™ OS or any other suitable OS for managing operations on the computer system 100.

The hardware platform 104 may include one or more processing devices 105 and a data store 107. In one implementation, the data store 107 comprises one or more hardware or software devices, which may be located internally or externally to the computer system 100. Examples of data store 107 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 104 may include additional hardware devices 109, such as network interface cards (NICs), sound or video adaptors, photo/video cameras, printer devices, keyboards, displays or any other suitable device intended to be coupled to a computer system.

In one implementation, the OS 102 includes a script execution component 106 for providing a set of utilities for storing and executing the scripts. In one example, the script is a test script employed for testing a software application.

In one implementation, one of the utilities provided by the script execution component 106 is a library of one or more various executable scripts (a.k.a. scripts) 110a-110n stored in a script data store 108. The scripts 110 may comprise a plurality of executable statements.

In one implementation, each of the scripts 110 includes a plurality of script description strings (a.k.a. descriptions) associated with the script. The description may include an execution condition (a.k.a. condition) associated with the script. The condition specifies a situation under which the script is to be executed. The description may also include an action associated with the condition. In one implementation, the action is to be performed when the condition occurs. In one implementation, the action automatically occurs when the condition occurs. In one implementation, the script including the descriptions may be provided by an external system (not shown) via a user interface such as a graphical user interface (GUI) 150.

In one implementation, the script execution component 106 includes a script plugin component 112, which functions to control execution of the scripts 110 based on the descriptions associated with the script. The script plugin component 112 uses the description associated with the script to generate the conditional statements to be incorporated or encoded into the script. In one implementation, the script plugin component 112 parses the description to retrieve a condition and an action associated with the condition. In one implementation, the script plugin component 112 interprets the description. The script plugin component 112 may interpret the description by evaluating the condition. In one implementation, the script plugin component 112 generates a conditional statement based on the evaluated condition. The conditional statement may include to perform the action based on the condition. In one implementation, the action is to be performed when the condition occurs. In one implementation, the action may automatically occur when the condition occurs. Some examples of the conditional statement may include but not limited to, failing the script execution if certain output is shown by the script, or not failing the global execution when certain output is shown, even if one of the steps of the script failed. In one implementation, the script execution component 106 executes the script 110 including the conditional statement. As such, the script plugin component 112 functions to control execution of the script 110 and controls status from the executed script 110.

FIG. 2 provides examples of the scripts 210 including the descriptions according to an implementation of the disclosure. The scripts 210 are same as the scripts 110 of FIG. 1. As discussed above, the script may comprise a plurality of executable statements. Some examples of the scripts 210 include, but are not limited to Script1 210a, Script2 210b and Script3 210c.

As discussed above, each of the scripts 210 includes a plurality of descriptions 212 associated with the script. The description 212 may include an execution condition (a.k.a. condition) 214 associated with the script 210. The condition specifies a situation under which the script is to be executed. The description may also include an action 216 associated with the condition 214. Also, as discussed above, the conditional statement 218 is generated based on evaluating of the condition 214. The conditional statement 218 may include to perform the action 216 based on the evaluated condition 214.

One example of a description 212a associated with the Script1 210a includes "WAITFOR(myotherjob#123)". In this example, the "myotherjob#123" is a condition 214a and the "WAITFOR" is an action 216a associated with the condition 214a. The script plugin component 112 may interpret this description 212a and generate a conditional statement 218a as "will avoid the test from running until 'myotherjob' has run for the 123' time". Another example of a description 212b associated with the Script1 210a includes 'IGNORE(LOG:some error string). In this example, the "LOG:some error string" is a condition 214b and "IGNORE" is an action 216b associated with the condition 214b. The script plugin component 112 may interpret this description 212b and generate a conditional statement 218b as "will ignore the errors in the run log that that match 'some error string'".

One example of a description 212c associated with the Script2 210b includes "WAITFOR(GERRITUS:12345)" in which "GERRITUS:12345" is a condition 214c and "WAITFOR" is the action 216c associated with the condition 214c. The script plugin component 112 may interpret this description 212c and generate a conditional statement 218c as "will avoid the test from running until the path 12345 has merged". Another example of a description 212d associated with the Script2 210b includes "FAILIF(LOG:some string)" in which "IFLOG:some string" is a condition 214d and "FAIL" is the action 216d associated with the condition 214d. The script plugin component 112 may interpret this description 212d and generate a conditional statement 218d as "and this will fail the job if the string is found". Another example of a description 212e associated with the Script3 210c includes "CLOSEONPASS(BZ:1234)" in which "BZ: 1234" is a condition 214e and "CLOSEONPASS" is the action 216e associated with the condition 214e. The script plugin component 112 may interpret this description 212e and generate a conditional statement 218e as "this will close the bug number 1234 in Bugzilla when the next time it passes the test".

Figure 3:
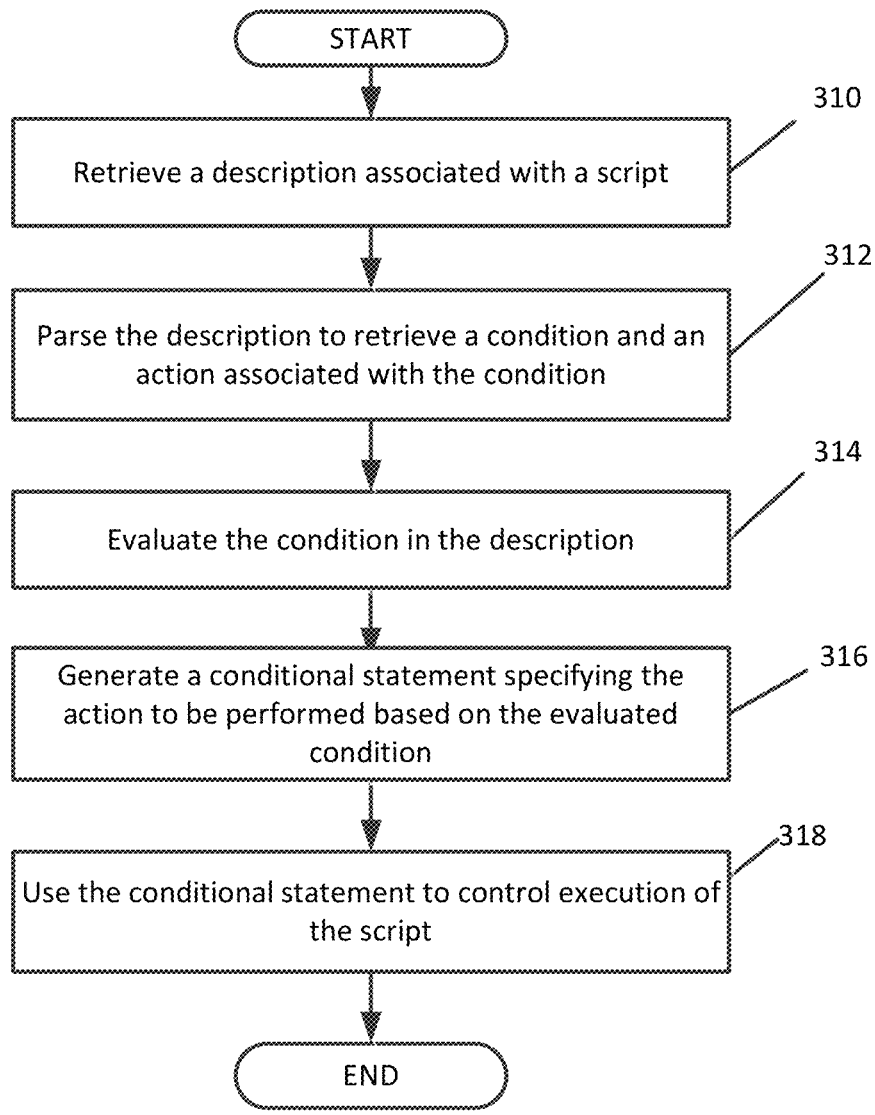
FIG. 3 is a flow diagram of one implementation of a method for using script description to encode conditional statements.

FIG. 3 illustrates a method 300 for using script descriptions to encode conditional statements according to one implementation of the disclosure. Method 300 may be performed by processing logic that may comprise hardware (e.g., circuitry, dedicated logic, programmable logic, microcode, etc.), software (such as instructions run on a processing device), or a combination thereof. In one implementation, method 300 is performed by the SAC component 120 of FIG. 1.

Method 300 begins at block 310 where a description string (a.k.a. description) associated with an executable script (a.k.a. script) is retrieved. As discussed above, the description may include an execution condition (a.k.a. condition) associated with the script. The condition specifies a situation under which the script is to be executed. The description may also include an action associated with the condition. In one implementation, the action is to be performed when the condition occurs. In one implementation, the action automatically occurs when the condition occurs. In one implementation, the script including the descriptions may be provided by a user.

At block 312, the description is parsed to retrieve a condition and an action associated with the condition. At block 314, evaluate the condition in the description. At block 316, generate a conditional statement specifying the action to be performed based on the evaluated condition. At block 318, use the conditional statement to control execution of the script. In one implementation, the conditional statement is incorporated into the executable script. In one implementation, the executable script including the conditional statement is executed.

Figure 4:
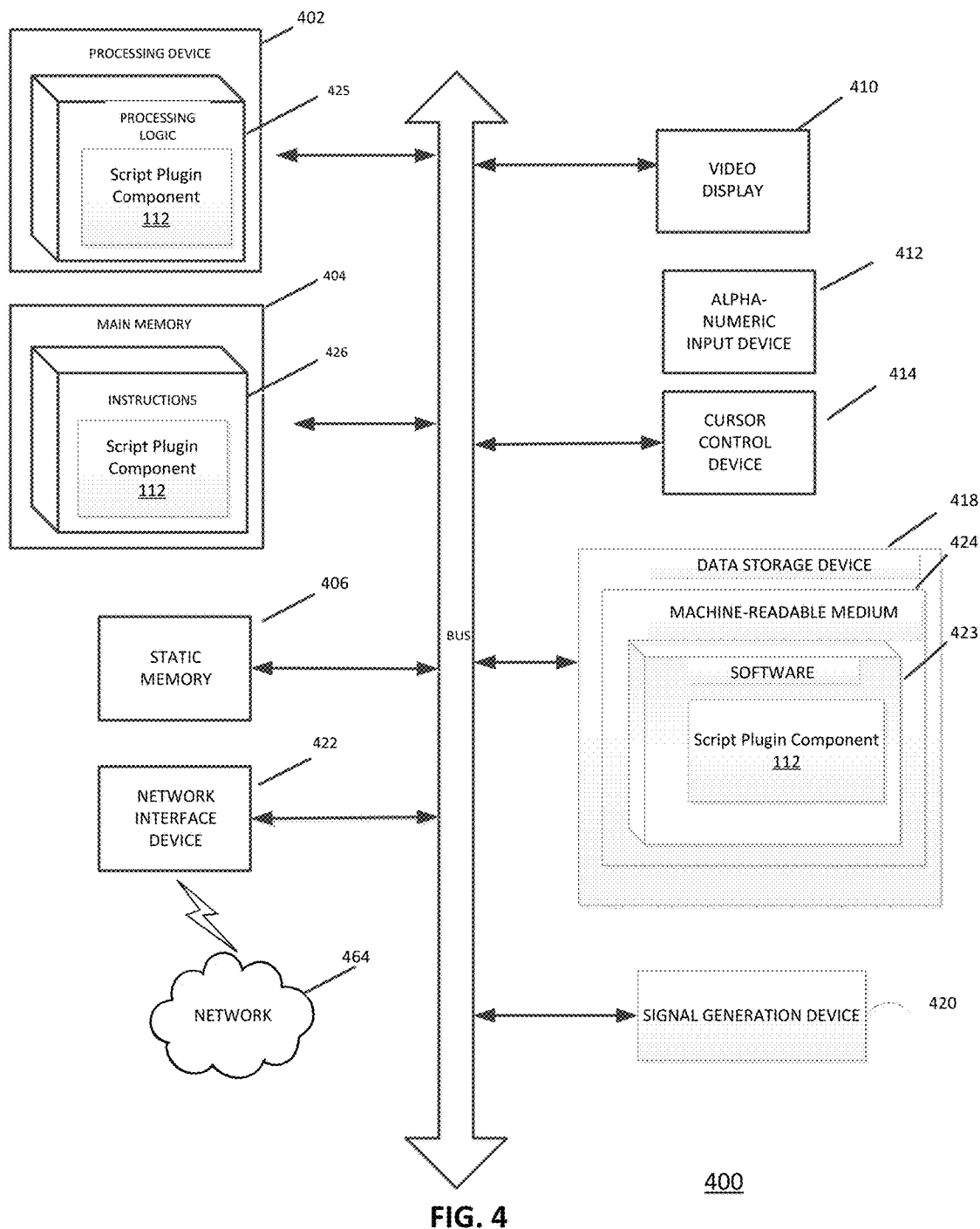
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 425 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 423 embodying any one or more of the methodologies of functions described herein. The software 423 may also reside, completely or at least partially, within the main memory 404 as instructions 426 and/or within the processing device 402 as processing logic 425 during execution thereof by the computer system 400; the main memory 404 and the processing device 402 also constituting machine-accessible storage media.

The machine-readable storage medium 424 may also be used to store instructions 426 to implement a script plugin component to implement using script description to encode conditional statements, such as the script plugin component 112 described with respect to FIG. 1, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding, or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "retrieving", "generating", "evaluating", "parsing", "providing", "using", "running", "incorporating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method implemented by a computer system comprising a processing device and memory-stored executable instructions which, responsive to being executed by the processing device, cause the processing device to perform the method, comprising:
   receiving an input in a description field associated with an executable test script in a software testing environment, wherein the input comprises a description string that is distinct from the executable test script and specifies a condition that identifies a string in a run log associated with an execution of the executable test script and an action to be performed responsive to the identified string;
   receiving a job requesting the execution of the executable test script to test aspects of a software application;
   identifying, by the processing device, the description string associated with the executable test script;
   parsing the description string to identify the condition and the action associated with the condition;
   evaluating, by the processing device, the condition in the description string;
   generating, by the processing device, in view of the evaluated condition, a conditional statement specifying the action to be performed based on the evaluated condition; and
   using, by the processing device, the conditional statement to control execution of the executable test script.

2. The method of claim 1 further comprising running the executable test script comprising the conditional statement.

3. The method of claim 1, wherein the action is associated with the condition.

4. The method of claim 1, wherein the action is to be performed in response to an occurrence of the condition.

5. The method of claim 1, wherein the using comprising incorporating the conditional statement into the executable test script.

6. A system comprising:
   a memory;
   a processing device, operatively coupled to the memory, to:
      receive an input in a description field associated with an executable test script in a software testing environment, wherein the input comprises a description string that is distinct from the executable test script and specifies a condition that identifies a string in a run log associated with an execution of the executable test script and an action to be performed responsive to the identified string;
      receive a job requesting the execution of the executable test script to test aspects of a software application;
      identify the description string associated with the executable test script;
      parse the description string to identify the condition and the action associated with the condition;
      evaluate the condition in the description string;
      generate in view of the evaluated condition, a conditional statement specifying the action to be performed based on the evaluated condition; and
      use the conditional statement to control execution of the executable test script.

7. The system of claim 6, the processing device is further to run the executable test script comprising the conditional statement.

8. The system of claim 6, wherein the action is associated with the condition.

9. The system of claim 6, wherein the processing device is to perform the action in response to an occurrence of the condition.

10. The system of claim 6, wherein the processing device is to incorporate the conditional statement into the executable script.

11. A non-transitory computer-readable storage medium comprising instructions that, responsive to being executed by a processing device, cause the processing device to:
   receive an input in a description field associated with an executable test script in a software testing environment, wherein the input comprises a description string that is distinct from the executable test script and specifies a condition that identifies a string in a run log associated with an execution of the executable test script and an action to be performed responsive to the identified string;
   receive a job requesting the execution of the executable test script to test aspects of a software application;
   identify the description string associated with the executable test script;
   parse the description string to identify the condition and the action associated with the condition;
   evaluate the condition in the description string;
   generate, by the processing device, in view of the evaluated condition a conditional statement specifying the action to be performed based on the evaluated condition; and
   use the conditional statement to control execution of the executable test script.

12. The non-transitory computer-readable storage medium of claim 11, the processing device is further to run the executable test script comprising the conditional statement.

13. The non-transitory computer-readable storage medium of claim 11, wherein the action is associated with the condition.

14. The non-transitory computer-readable storage medium of claim 11, the processing device further to perform the action in response to an occurrence of the condition.

15. The non-transitory computer-readable storage medium of claim 11, the processing device is to incorporate the conditional statement into the executable script.

* * * * *